C. P. BRUMBY.
COMBINATION LOCKING VALVE.
APPLICATION FILED JULY 8, 1914.
1,172,106.
Patented Feb. 15, 1916.
3 SHEETS—SHEET 2.
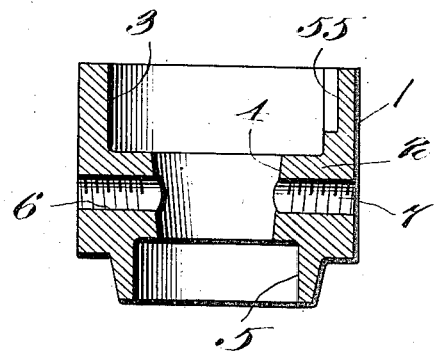
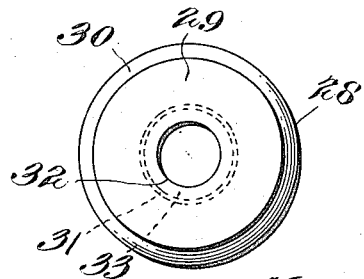
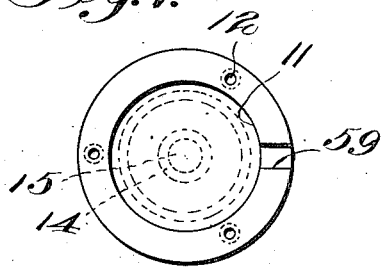
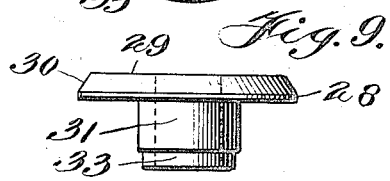
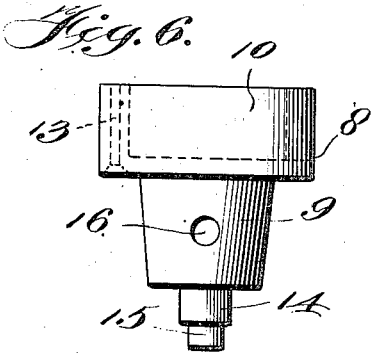
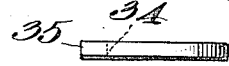
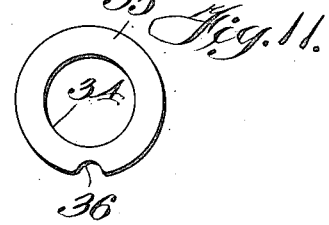
Witnesses
Inventor
C. P. Brumby,
By
Attorney

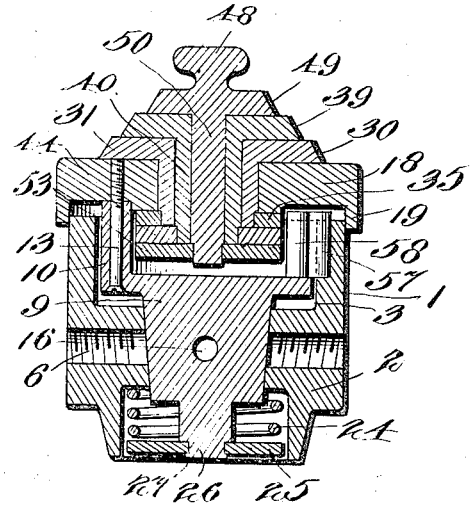

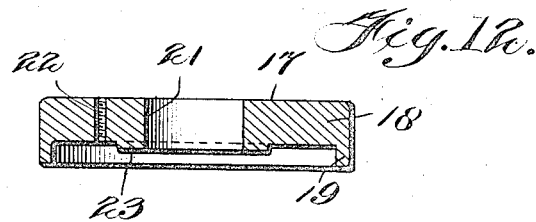
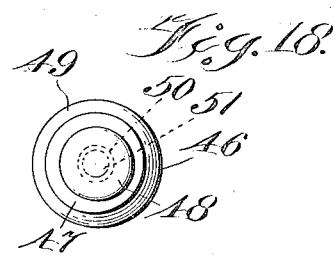
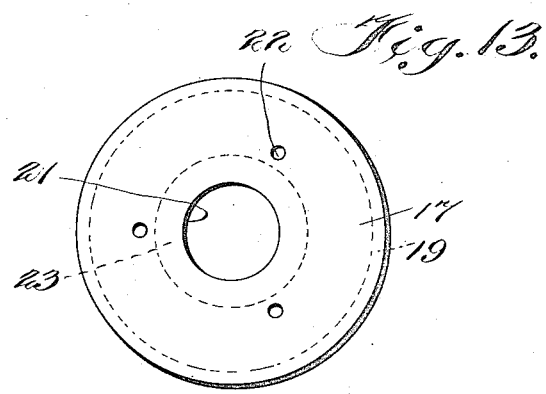
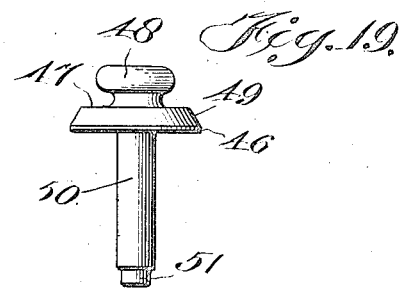
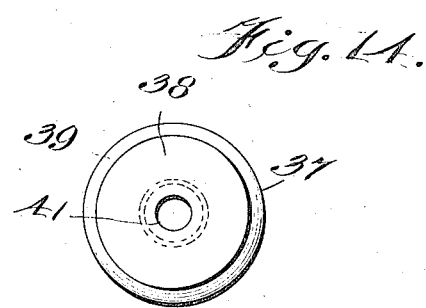
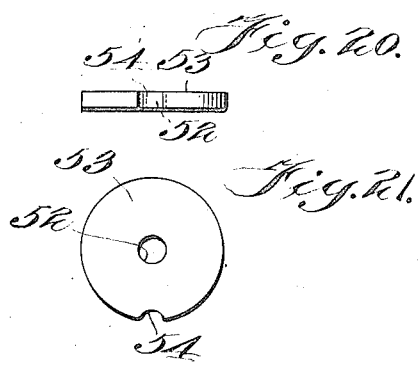
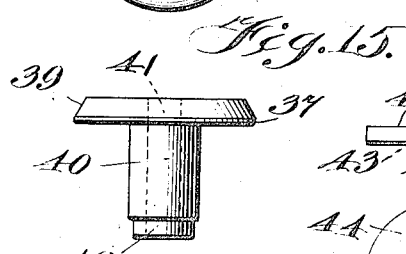
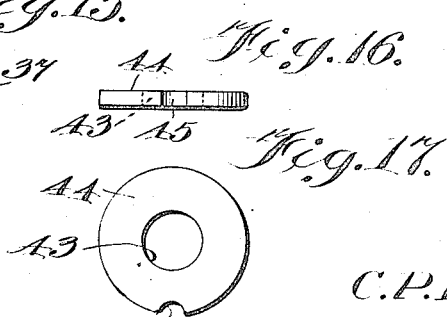

UNITED STATES PATENT OFFICE.

CLARENCE P. BRUMBY, OF EAST POINT, GEORGIA, ASSIGNOR OF ONE-HALF TO STONEWALL R. JACOBS, OF ATLANTA, GEORGIA.

COMBINATION LOCKING-VALVE.

1,172,106.     Specification of Letters Patent.     Patented Feb. 15, 1916.

Application filed July 8, 1914. Serial No. 849,735.

*To all whom it may concern:*

Be it known that I, CLARENCE P. BRUMBY, a citizen of the United States, residing at East Point, in the county of Fulton and State of Georgia, have invented certain new and useful Improvements in Combination Locking-Valves; and I do hereby declare the following to be a full, clear, and exact description of the invention, such as will enable others skilled in the art to which it appertains to make and use the same.

This invention relates to new and useful improvements in combination locking valves and has for its principal object to provide a valve carrying a combination lock which is designed especially for use on motor vehicles.

Another object of the invention is to provide a simple and efficient combination lock which will effectually frustrate any attempt of stealing the vehicle upon which the device is in use, or setting the same in motion by an unauthorized person.

A still further object of the invention is to provide a lock by which the flow of fuel to the carbureter of the vehicle may be controlled.

Still another object of the invention is to provide a lock which will lock the valve in either the closed or open position.

With these and other objects in view, the invention consists in the novel combination and arrangements of parts as will be fully set forth in the following specification and accompanying drawings, in which—

Figure 1 is a view in elevation of a valve and locking means constructed in accordance with this invention, Fig. 2 is a sectional view taken on the line 2—2 of Fig. 1, Fig. 3 is a top plan view of a valve constructed in accordance with this invention, Fig. 4 is a view similar to Fig. 3, showing the cap forming the valve handle removed, Fig. 5 is sectional view of the valve body, Fig. 6 is a view in elevation of the turning plug of the valve, Fig. 7 is a top plan view of Fig. 6, Fig. 8 is a top plan view of one of the dials, Fig. 9 is a view in elevation of Fig. 8, Fig. 10 is a view in elevation of one of the disks which coöperates with the dials illustrated in Fig. 8, Fig. 11 is a top plan view of Fig. 10, Fig. 12 is a sectional view of the cap forming the handle by which the valve is rotated, Fig. 13 is a top plan view thereof, Fig. 14 is a top plan view of another of the valves, Fig. 15 is a side view in elevation of Fig. 14, Fig. 16 is a side view in elevation of the disk carried by the dial 14, Fig. 17 is a top plan view of Fig. 16, Fig. 18 is a top plan view of the innermost dial, Fig. 19 is a side view in elevation thereof, Fig. 20 is a side view in elevation of the disk carried by the dial 18, Fig. 21 is a top plan view of Fig. 20, and Fig. 22 is a view similar to Fig. 4 showing the valve open.

Referring now to the drawings by characters of reference, the first portion to be described is the valve body designated generally by the numeral 1. This valve body 1 comprises the cylindrical body portion 2 having formed in its upper end the enlarged axial bore 3. This bore communicates with the axial tapered bore 4 which is ground to form the valve seat as will be more fully hereinafter described. A similar enlarged bore 5 is formed in the lower end of the body and communicates with the reduced end of the tapered bore 4 as clearly illustrated in Fig. 5. Formed in the body 2 and extending transversely thereof is the bore 6 which is provided at each terminal with the thread 7 by means of which the device is connected to the fuel supply of the vehicle upon which it is being used.

Having described the valve body, the next in turn is the valve which is designated generally by the numeral 8 and best illustrated in Fig. 6. This valve comprises the tapering body portion 9 having an enlarged cylindrical member 10 formed at the upper terminal thereof. This cylindrical member is provided with the enlarged bore 11 the use of which will appear as the description will proceed. A plurality of vertical apertures 12 are formed in the cylindrical body 10 between the outer edge thereof and the wall of the bore 11, and said apertures are arranged to receive the screws 13 by means of which the cap forming the valve handle, which will be more fully hereinafter described, is secured to the valve. A reduced cylindrical extension 14 is formed at the reduced end of the valve body 9, and said extension terminates at its free end in the reduced cylindrical portion 15, the use of which will appear as the description proceeds. Formed transversely of the valve 9 is the aperture 16, which is arranged to communicate with the aperture 6 to establish communication between the fuel supply of the vehicle and power generating means.

The main operating features of the valve having been described, it now remains to describe the parts by which the operation of the valve is controlled. One of these parts which is best illustrated in Fig. 12 comprises the handle member designated generally by the numeral 17 which comprises the disk 18 having formed at its periphery the flange 19 which is designed to fit over the periphery of the valve body 1 hereinbefore described. The periphery of this body 18 is preferably knurled as at 20 to form a gripping surface by means of which the operation of the valve may be controlled. Formed centrally of the disk 18 is the aperture 21 through which the valve locking means, which will be more fully hereinafter described, extends. A plurality of spaced apertures 22 are formed in the disk near the central apertures and are arranged to receive the threaded ends of the screws 13 hereinbefore referred to. A suitable depending portion 23 is formed centrally of the disk 18 and is arranged to form the abutment against which the upper locking member, which will be more fully hereinafter described rests.

Having thus described the valve body, the valve, and the controlling means therefor, it now remains to describe the means for keeping the valve tightly against its seat, which is best illustrated in Fig. 2. A suitable coil spring preferably of the compression type, is arranged to fit within the bore 5 and is designated by the numeral 24, this spring surrounds the depending cylindrical member 14 and is arranged to abut the plate 25 which is provided with the central aperture 26 which is of sufficient size to receive the portion 15, as shown in Fig. 2. This plate 25 is placed in position so that the spring is suspended thereagainst and after passing the member 15 through the central apertures 26 the said member 15 is flanged or upset as at 27, thereby securely holding the disk 25 in place on the valve. The essential figures of the valve having been described, it now remains to describe the locking means for said valve which comprise the several elements illustrated in detail in Figs. 8, 9, 10, 11, 14, 15, 18, 19, 20, and 21. The member shown in Figs. 8 and 9 comprises respectively the dial designated generally by the numeral 28 which comprises the body portion or disk 29 having the beveled edge 30. This disk is provided with the cylindrical sleeve 31 having the central bore 32 formed therein through which the remaining portion for the locking means extends. A cylindrical extension 33 is formed at the free terminal of the sleeve 31 and is arranged to extend through the aperture 34 formed in the washer or disk 35 which is carried by the lower terminal of the cylindrical member 31, as illustrated in Fig. 2. This washer 35 is provided with a suitable recess 36, the use of which will appear as description proceeds. A similar dial 37 comprising the body portion or disk 38 having a beveled edge 39 is provided, and said disk carries the sleeve 40 having a central opening 41 through which the dial, illustrated in Figs. 18 and 19 extends. This sleeve 40 is provided at its lower terminal with the reduced extension 42 which is arranged to project through the aperture 43 formed in the disk 44. This disk 44 is provided with a semi-circular notch or recess 45 which is arranged to register with the recess 36 in the disk 35 hereinbefore referred to.

In assembling the device, the sleeve 40 extends through the aperture 32 so that the dial 37 which is of less diameter than the dial 28 will rest on the upper surface of the dial 28, as shown in Fig. 3.

The remaining dial which is designated by the numeral 46 comprises the disk 47 having formed on the upper face thereof the knob 48 which forms the means by which the device is rotated. This disk 47 is provided at its edge with the beveled face 49 and carries on the side opposite the handle 48 the cylindrical extension 50 which terminates at its free end in the reduced extension 51 which extension is arranged to extend through the aperture 52 formed in the disk 53. This disk 53 is provided with the recess 54 which is arranged to register with the recesses 36 and 45 when the valve is being turned to its locked or unlocked position.

The valve body 2 is provided with a pair of recesses 55 and 56 which are at right angles to each other and are arranged to receive the roller 57 which coöperates with the roller 58 in holding the valve against rotation. These rollers are contained in the slot 59 formed in the cylindrical portion 10 of the valve 9 at 90 degrees from the longitudinal axis of the transverse aperture 16. Thus it will be seen that when the device is in an assembled position, the rollers 57 and 58 will assume the position illustrated in Figs. 2 and 4, thus holding the valve in its locked position.

From the foregoing it will be apparent that when a device is in its assembled position illustrated in Fig. 2 and the valve is locked, the rollers 57 and 58 will rest in the slot 59 and recess 55, thus holding the valve against movement with relation to the valve body. When it is desired to unlock the valve, the dials are turned to the proper position so that the recesses 36, 45 and 54 will register and come into direct alinement with the slots 59 and when the handle portion 17 of the valve is turned, the rollers will be forced into the recesses 36, 45 and 54, thereby permitting the valve to turn freely within the valve seat. The valve is then turned to its open position at which time the rollers will come in alinement with the recess 56 and communication will be established through the apertures 16 and the valve body. By turning one of the dials it will be apparent that the roller will be forced into the recess 56 and the valve will then be held in non-rotatable position, thus preventing unauthorized persons from interfering with the flow of fuel through the supply pipe and valve. It will thus be seen that a simple and efficient valve which may be locked in either open or closed position is provided and which will effectually prevent unauthorized persons from tampering with the vehicle upon which the valve is used.

While in the foregoing there has been shown and described the preferred embodiment of this invention it is to be understood that such changes in the combination and arrangement of parts as may fall within the scope of the claims may be resorted to without departing from the spirit and scope of the invention.

Having thus described my invention, I claim:—

1. A valve comprising a body, an axial bore in its upper end and also having an axial bore in its lower end, the body being provided with a tapered bore providing a valve seat, and connecting the bores, the body also having a transverse aperture communicating with the tapered bore, a valve engaging the valve seat, said valve being provided with a transverse aperture for communicating with the transverse aperture in the body, a flange extending upwardly from the upper end of the valve, a handle secured to the flange and forming a cap for the valve body, the handle being provided with an axial bore, disks on the under face of the handle positioned within the confines of the flange, means controlling the rotation of the disks and means controlled by the rotation of the disks to lock the relief or lock the valve.

2. A locking valve comprising a body, said body provided with an enlarged axial bore, a tapered bore communicating with the axial bore, a second enlarged bore formed in the lower portion of the body and communicating with the tapered bore, said body also provided with a transverse aperture extending therethrough and communicating with the tapered bore, a tapered valve plug having a transverse aperture therethrough and having an enlarged central bore at its upper end, said plug seated within the enlarged bore of the valve body, means in the lower bore of the valve body engaging the lower end of the valve plug to hold the same in engagement with the wall of the bore, a circular handle provided with a central aperture and a peripheral flange mounted on the upper end of said valve body, disks positioned through the central portion of the aperture of the handle and rotatably seated in the enlarged central portion of the valve plug, each of said disks provided with a peripheral recess, vertical standing rollers secured in the enlarged axial bore of the valve plug adapted to engage the peripheral recesses of the disks to prevent movement of the same and allow the valve plug to be turned when bringing its aperture in registration with the transverse aperture of the valve body.

3. A locking valve comprising a cylindrical body having an upper and lower axial bore, a central bore forming a valve seat communicating with the upper and lower bores, said body also provided with a transverse extending recess or aperture communicating with the central bore, a valve plug also provided with an enlarged axial bore, its lower end tapered, a handle having a peripheral flange and provided with a central aperture mounted over said body and means for connecting the valve plug to said handle for the rotation of the same upon movement of said handle, a plurality of disks seated in the axial bore of the plug, their upper ends overlying the handle, each of said disks provided with a peripheral recess and vertical rollers mounted in the axial bores of the body and plug and adapted to engage the recesses of the disks upon movement of the same and allow the valve plug to be turned upon movement of the handle.

In testimony whereof I affix my signature in presence of two witnesses.

CLARENCE P. BRUMBY.

Witnesses:
T. S. PHILLIPS,
B. B. BAKER.